United States Patent
Barsness et al.

(10) Patent No.: US 10,346,385 B2
(45) Date of Patent: Jul. 9, 2019

(54) ATTRIBUTE LOCKING OF STREAM COMPUTING TUPLES

(71) Applicant: International Business Machines Corporation, Armonk, NY (US)

(72) Inventors: Eric L. Barsness, Pine Island, MN (US); Daniel E Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/265,818

(22) Filed: Sep. 14, 2016

(65) Prior Publication Data
US 2018/0075075 A1  Mar. 15, 2018

(51) Int. Cl.
G06F 17/30 (2006.01)
G06F 16/23 (2019.01)

(52) U.S. Cl.
CPC .............. *G06F 16/2343* (2019.01)

(58) Field of Classification Search
USPC ......................................... 707/704
See application file for complete search history.

(56) References Cited

U.S. PATENT DOCUMENTS

| | | | |
|---|---|---|---|
| 6,339,772 B1 | 1/2002 | Klein et al. | |
| 6,690,503 B2 | 2/2004 | Yamanaka | |
| 7,181,452 B1 | 2/2007 | Luo et al. | |
| 2005/0049996 A1* | 3/2005 | Srinivasan | G06F 17/30917 |

* cited by examiner

*Primary Examiner* — Hung T Vy
(74) *Attorney, Agent, or Firm* — Middleton Reutinger

(57) ABSTRACT

Tuple attribute locking is implemented in a stream computing environment to selectively inhibit access to one or more attributes of tuples by stream operators.

19 Claims, 7 Drawing Sheets

ATTRIBUTE LOCKING OF STREAM COMPUTING TUPLES

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data in a stream computing environment with the use of tuple attribute locking. Consistent with one aspect of the invention, a method of processing a stream of tuples may include receiving a stream of tuples to be processed by a plurality of processing elements operating on one or more computer processors, with each processing element having one or more stream operators. In a first stream operator in a first processing element, a first tuple received from the stream of tuples may be processed, where the first tuple includes a plurality of attributes, a first attribute among the plurality of attributes having a lock associated therewith. For the first stream operator, a status of the lock associated with the first attribute may be determined, and access to the first attribute by the first stream operator may be selectively inhibited based upon the determined lock status.

In some embodiments, determining the lock status is performed by a stream runtime accessible by the plurality of processing elements. Also, in some embodiments, the lock is stored as metadata passed with the first tuple, and determining the status of the lock includes accessing the metadata passed with the first tuple. Also, in some embodiments, the lock is stored in a shared storage accessible to the plurality of processing elements, and determining the status of the lock includes accessing the shared storage.

Some embodiments may further include setting the lock in response to processing of the first tuple by a second stream operator that is upstream of the first stream operator, where determining the status of the lock includes determining that the lock is set, and selectively inhibiting access to the first attribute by the first stream operator includes denying write access to the first attribute by the first stream operator. Further, in some embodiments, setting the lock is performed in response to an explicit request by the second stream operator.

In some embodiments, the lock includes a lock trigger condition that automatically sets the lock in response thereto to restrict access to the first attribute by one or more stream operators after the lock trigger condition has been met. In some embodiments, the lock trigger condition sets the lock in response to modification by one or more stream operators, or sets the lock in response to meeting a time threshold, meeting a value threshold for the first attribute, meeting a value change threshold for the first attribute, or meeting a consistency threshold for the first attribute.

In some embodiments, the lock includes an unlock trigger condition that automatically releases the lock in response thereto to permit access to the first attribute by one or more stream operators after the unlock trigger condition has been met. In some embodiments, the unlock trigger condition is stored with metadata passed with the first tuple, and the lock may be released after receipt by a second stream operator in response to accessing the metadata in the second stream operator. Some embodiments may also include releasing the lock in response to a command from a stream runtime. In addition, in some embodiments, releasing the lock includes releasing the lock automatically after meeting a time threshold or a count threshold. Moreover, in some embodiments, the lock has an operator condition that selectively inhibits access to the first attribute by a subset of stream operators, and some embodiments may also include in response to denying access to the first attribute, waiting in the first stream operator for the lock to be released.

In some embodiments, waiting in the first stream operator for the lock to be released includes waiting in a background thread of the first stream operator and processing other tuples out of order in a main thread of the first stream operator. Moreover, in some embodiments, waiting in the first stream operator for the lock to be released includes waiting until a time or pending threshold is met.

Some embodiments may also include continuing to permit access to other attributes of the first tuple by the first stream operator when access is inhibited to the first attribute. In addition, some embodiments may also include establishing the lock using an API or a policy for a stream computing application.

Some embodiments may also include an apparatus including a plurality of processing elements configured to process a stream of tuples, the processing elements operating on one or more computer processors, each processing element having one or more stream operators and program code configured to perform any of the aforementioned operations. Some embodiments may include a program product for processing a stream of tuples, the program product comprising a non-transitory computer readable storage medium having program code embodied therewith, the program code comprising computer readable program code configured to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

Like reference numbers and designations in the various drawings indicate like elements.

DETAILED DESCRIPTION

Figure 1:
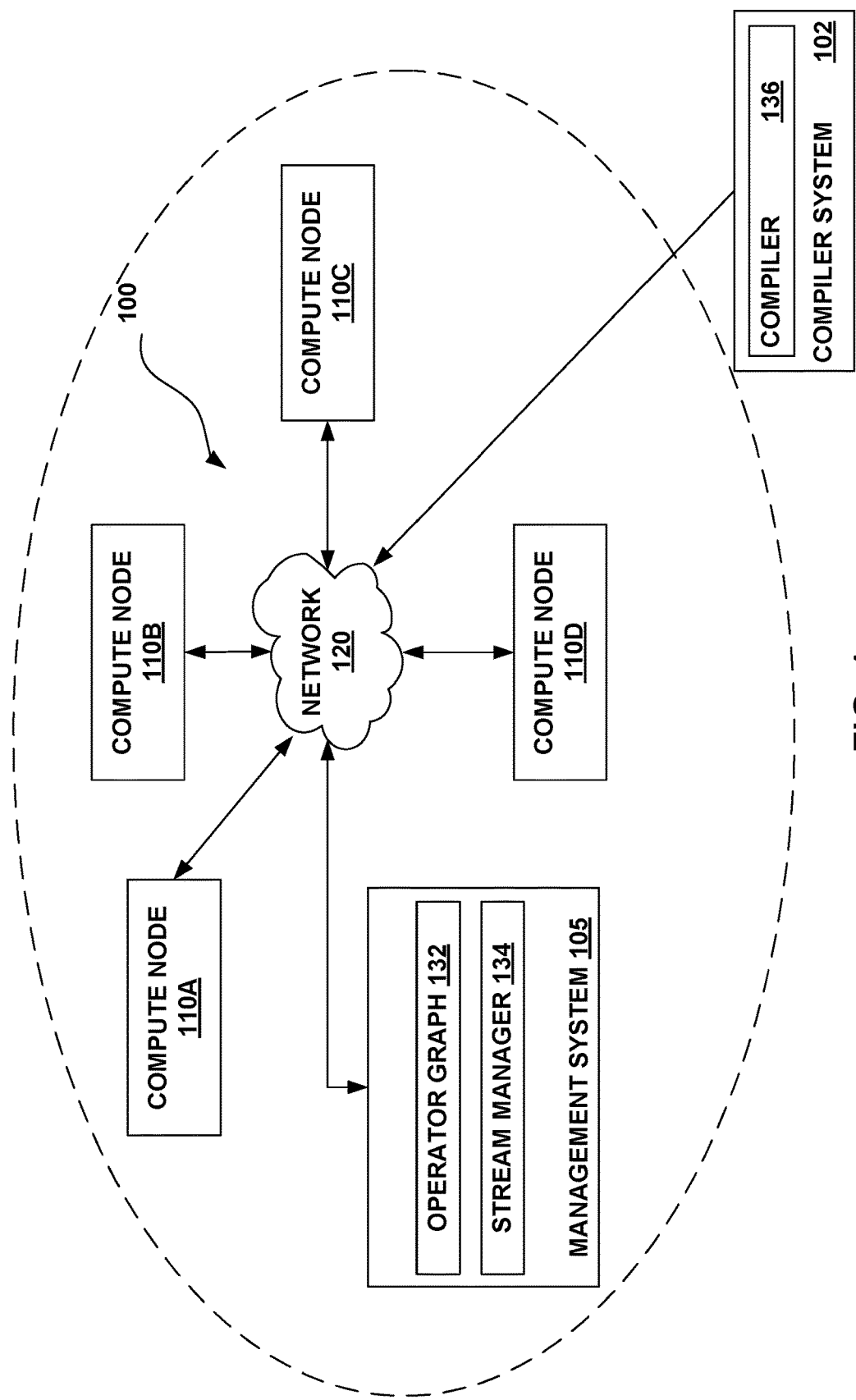
FIG. 1 illustrates a computing infrastructure configured to execute a stream computing application according to various embodiments.

Stream-based computing and stream-based database computing are emerging as a developing technology for database systems. Products are available that allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are generally connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability may be achieved by distributing an application across nodes by creating executables (i.e., processing elements), as well as replicating processing elements on multiple nodes and load balancing among them. Stream operators in a stream computing application can be fused together in some instances to form a processing element that is executable. Doing so allows processing elements to share a common process space, generally resulting in much faster communication between stream operators than is available using inter-process communication techniques (e.g., using a TCP/IP socket). Further, in some instances processing elements can be inserted or removed dynamically from an operator graph representing the flow of data through the stream computing application. In some instances, a particular stream operator may not reside within the same operating system process as other stream operators. In addition, stream operators in the same operator graph may be hosted on different nodes, e.g., on different compute nodes or on different cores of a compute node.

Data generally flows from one stream operator to another in the form of a "tuple." A tuple may be considered to be a sequence of one or more attributes associated with an entity. Attributes may be any of a variety of different types, e.g., integer, float, Boolean, string, etc. The attributes may also be ordered. In addition to attributes associated with an entity, a tuple may include metadata, i.e., data about the tuple. A tuple may be extended by adding one or more additional attributes or metadata to it. As used herein, "stream" or "data stream" may be considered to refer to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications often handle massive volumes of data that need to be processed efficiently and in real time. For example, a stream computing application may continuously ingest and analyze hundreds of thousands of messages per second and up to petabytes of data per day. Accordingly, each stream operator in a stream computing application may be configured to process a received tuple within fractions of a second. In addition, a concern may exist in some instances as to data integrity and ensuring that tuple attributes are modified only in appropriate circumstances and only by authorized stream operators. Generally, under existing approaches, any stream operator is permitted to add, modify or delete tuple attributes, and as a result, a risk exists that a stream operator could inadvertently or even maliciously modify a tuple attribute that has been set or otherwise modified by another stream operator earlier in an operator graph.

Embodiments of this disclosure are therefore directed to a method and apparatus that may enhance the ability of a stream computing application to protect tuple attributes processed by an operator graph of stream operators. In one embodiment, the method may associate with one or more attributes of a tuple a lock that may be used to selectively inhibit access to those attributes by one or more stream operators. As will become more apparent below, locks may be set manually or automatically in different embodiments, and trigger conditions may be used to control when locks are set and/or released. Locks may, in some embodiments, be incorporated into the metadata of a tuple such that the locks are passed between stream operators along with their associated tuples. In other embodiments, locks may be maintained separately from their associated tuples, e.g., in a shared storage. The use of locks may, in some embodiments, enhance performance of a streaming computer environment by protecting tuple attributes from unauthorized or otherwise undesirable modifications with little processing overhead.

FIG. 1 illustrates one example computing infrastructure 100 that may be configured to execute a stream computing application, according to some embodiments. The computing infrastructure 100 includes a management system 105 and two or more compute nodes 110A-110D—i.e., hosts—that are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
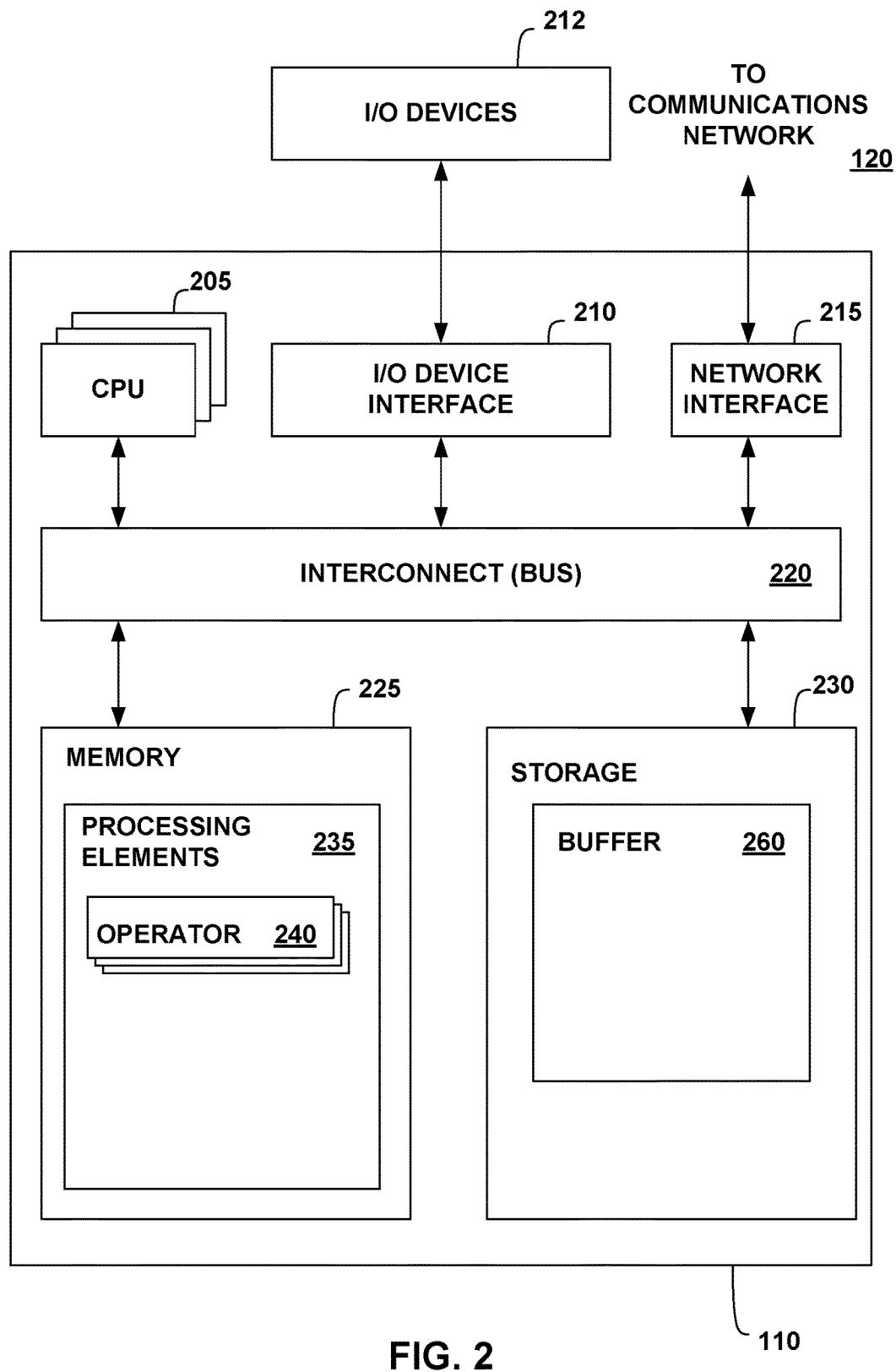
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205.

The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems (not shown), which may be stored partially in memory 225 and partially in storage 230. Alternatively, an operating system may be stored entirely in memory 225 or entirely in storage 230. The operating system may provide an interface between various hardware resources, including the CPU 205, and processing elements and other components of the stream computing application. In addition, an operating system provides common services for application programs, such as providing a time function.

Figure 3:
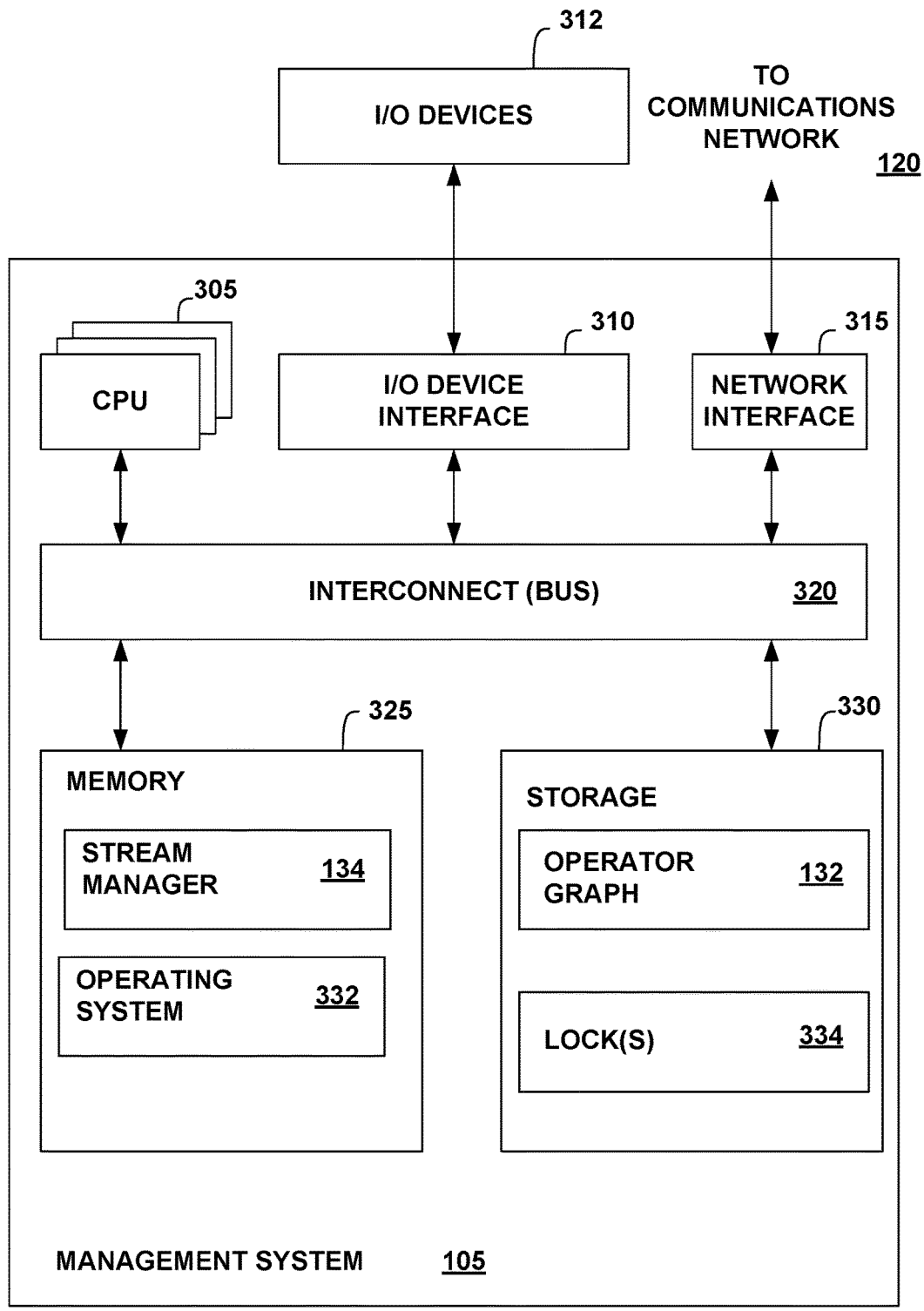
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may also include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
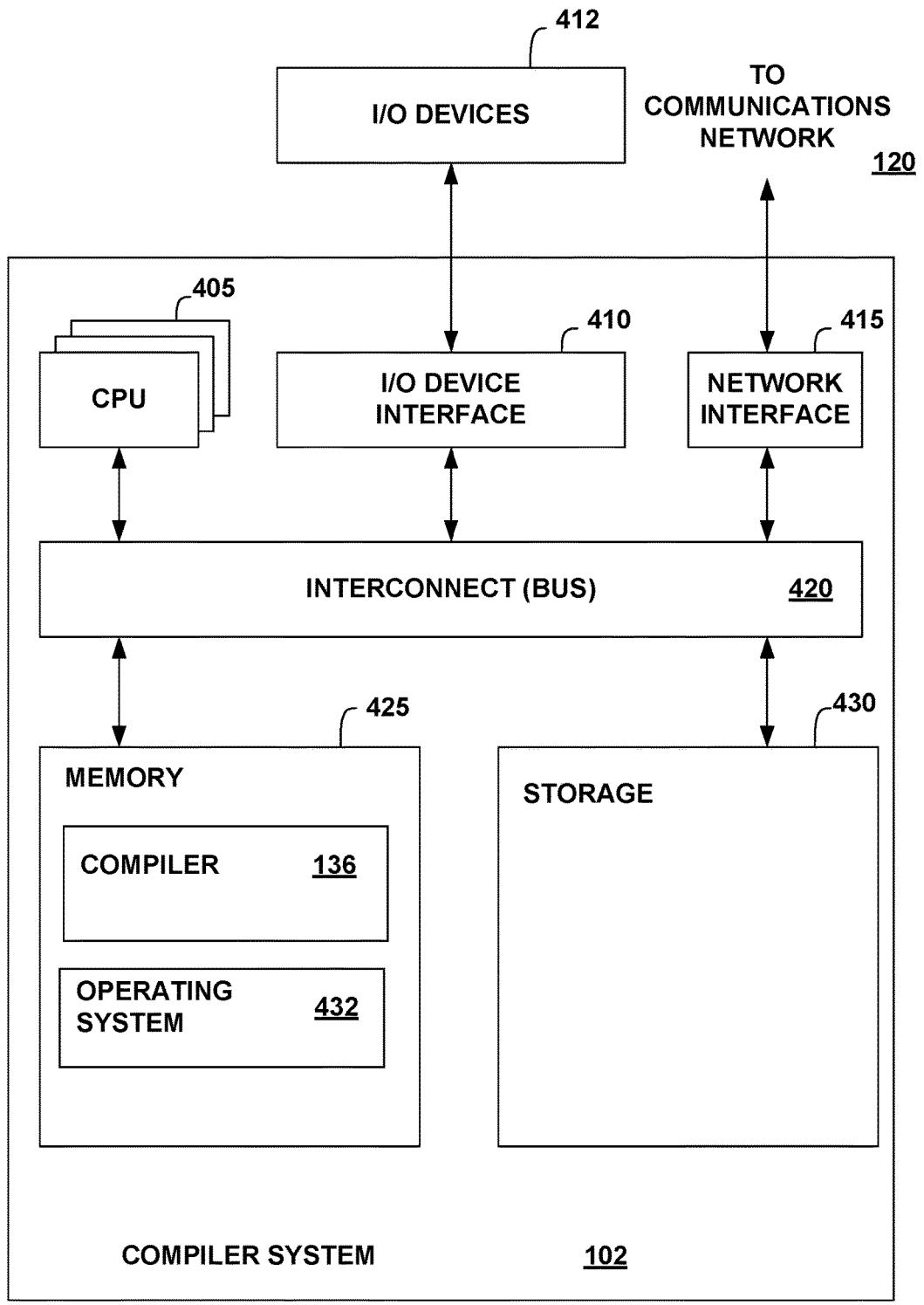
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
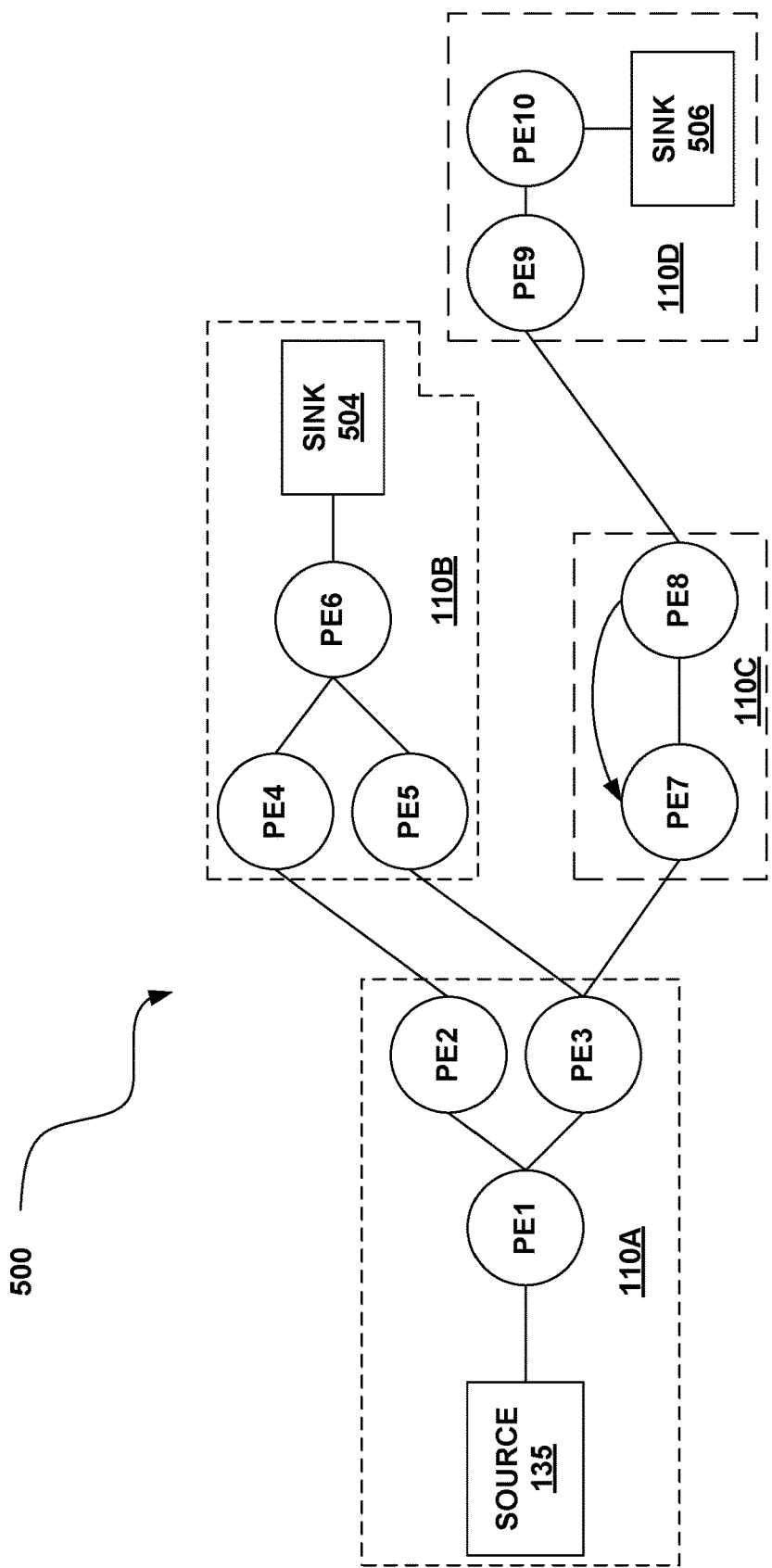
FIG. 5 illustrates an operator graph for a stream computing application according to various embodiments.

FIG. 5 illustrates an example operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

It will be appreciated that in some stream computing applications, large volumes of data may be processed in the form of tuples and by multiple stream operators in an operator graph. Moreover, a risk may exist that tuple data, e.g., attributes, may be modified by stream operators in situations where such modifications may not be desired. The processing activities and responsibilities in a stream computing application are generally partitioned between different stream operators, and as such, it may be undesirable to permit stream operators to modify data for which other stream operators have responsibility. For example, in facial recognition or financial transaction analysis applications, some stream operators may be responsible for updating confidence levels for the tuples being processed by an application. Were a stream operator to determine that a certain confidence level was reached, it would sometimes not be desirable for downstream stream operators to overwrite this confidence level. In addition, in some instances, once a certain confidence level is reached, further processing of a tuple may be unnecessary. In embodiments consistent with the invention, in contrast, tuple attribute locking may be used to protect tuple attributes from further modifications, and in some instances, improve performance through the elimination of unnecessary processing of locked tuple attributes.

Figure 6:
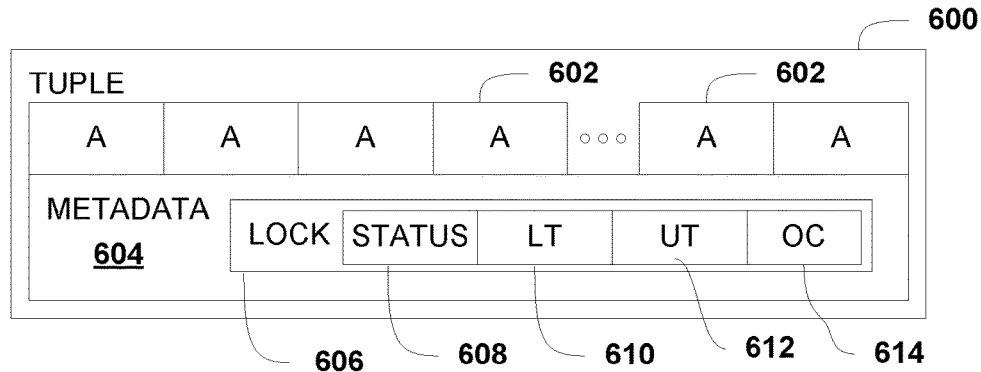
FIG. 6 illustrates a tuple for a stream computing application according to various embodiments.

Tuple attribute locking consistent with the invention may be implemented in a number of different manners consistent with the invention. For example, in some embodiments, a lock may be stored in a shared storage available to the various stream operators in an operator graph, e.g., as illustrated at 334 in FIG. 3. In other embodiments, e.g., as illustrated in FIG. 6, a lock may be passed through an operator graph along with an associated tuple. In other embodiments, different data associated with a lock may be stored in a shared storage and passed along with a tuple. For example, in the latter instance an indication may be provided in a tuple that a certain attribute is associated with a lock, with the configuration and/or status of the lock maintained in shared storage. Processing of locks, e.g., to set, configure, release, check, etc., may be implemented in part or in whole in a streaming runtime, accessible by the stream operators in an operator graph. Further, portions of lock processing may be implemented within stream operators themselves, and or in other external components. Other variations will be appreciated by those of ordinary skill in the art having the benefit of the instant disclosure.

FIG. 6, in particular, illustrates an example tuple 600 including a plurality of attributes 602. Tuple 600 additionally includes metadata 604, which generally defines the type and/or schema for the tuple, along with providing other characterizing information such as a unique identifier, performance data, age data, etc. In this embodiment, however, metadata 604 also includes one or more locks 606, along with various types of lock-related data, e.g., a status 608, a lock trigger condition 610, an unlock trigger condition 612 and/or an operator condition 614. It will be appreciated that one or more of the aforementioned types of data may be omitted in some embodiments or may be maintained in storage external to a tuple in some embodiments.

Each lock 606 may be associated with one or more attributes 602. Moreover, it will be appreciated that some attributes 602 may not be associated with any lock, and that even when access is inhibited to a particular attribute of a tuple by a lock, other attributes of that tuple that are not restricted by the lock or another lock may be freely accessed.

Status 608 may be used to identify whether the lock is current set or unset, i.e., whether the lock is currently inhibiting access to the associated attribute(s). It will be appreciated that some locks may be manually set and/or unset, and thus, some locks may include only a status 608. In such situations, lock setting or releasing may be performed in response to explicit requests from stream operators. Thus, an upstream stream operator may set a lock on an attribute of a tuple, and then downstream, another stream operator intending to modify the tuple attribute may access the lock and determine whether or not the lock is set. If not set, the downstream stream operator may access the attribute, and if set, the downstream stream operator may be prevented from accessing the attribute.

Other locks may include one or more of a lock trigger condition, an unlock trigger condition, and an operator condition that may be used to specify conditions under which a lock will automatically be set or released (i.e., without an explicit operator request). Lock trigger condition 610 may define one or more conditions that may cause a lock to be set. Various types of conditions may be defined in different embodiments. For example, one type of lock trigger condition sets a lock in response to an attribute being modified by a stream operator. Another type of lock trigger condition sets a lock in response to an attribute being modified X times or by X different operators. Yet another type of lock trigger condition sets a lock in response to meeting a time threshold (e.g., after X minutes). Another type of lock trigger condition sets a lock in response to meeting a value threshold for an attribute (e.g., where an attribute is set to a value meeting a threshold or limit) or meeting a value change threshold for an attribute, (e.g., where an attribute has changes by more than X percent). Still another type of lock trigger condition sets a lock in response to meeting a consistency threshold for an attribute, e.g., if the attribute has remained constant for a given time period, or for a given number of operator passes.

Unlock trigger condition 612 may similarly define one or more conditions that may cause a lock to be released. For example, one type of unlock trigger condition may release a lock based on a time threshold (e.g., after a given period of time) or based on a count threshold (e.g., after a given number of tuples has been processed).

In some embodiments, an unlock trigger condition may be stored with the metadata passed with the first tuple, such that a downstream stream operator, upon receiving a tuple with a locked attribute, may release the lock upon a determination that the unlock trigger condition has been met. In addition, in some instances set and release decisions may be made within a stream operator in some embodiments, while in other embodiments, a stream runtime may determine the status of a lock and stream operators may simply query the stream runtime to obtain the status of a lock.

An operator condition 614 may be used to limit access to only a subset of stream operators. An operator condition, for example, may apply restrictions to less than all stream operators, whether on an operator-by-operator basis, or based on some common characteristic of a stream operator, e.g., an operator type, the computer system upon which the operator is resident, etc. In some embodiments, an operator condition may prevent all stream operators not meeting the operator condition from having access to a tuple attribute, while in other embodiments, stream operators not meeting an operator condition may have unlimited access. Multiple operator conditions may also be used in some instances to define different trigger conditions and/or rights for different stream operators. In some embodiments, limits to access rights may also be implemented in other manners, e.g., by providing a required access key to only certain stream operators, through the use of public-private key pairs, etc.

Other types of data may be associated with a lock in other embodiments. For example, different access rights may be defined for a lock, e.g., depending upon the type of access. Thus, for example, while the embodiments discussed herein focus on write or modify access, whereby a set lock prevents an attribute from being written to or modified, other types of access may also be controlled using tuple attribute locking consistent with the invention, e.g., read access, delete access, etc.

Figure 7:
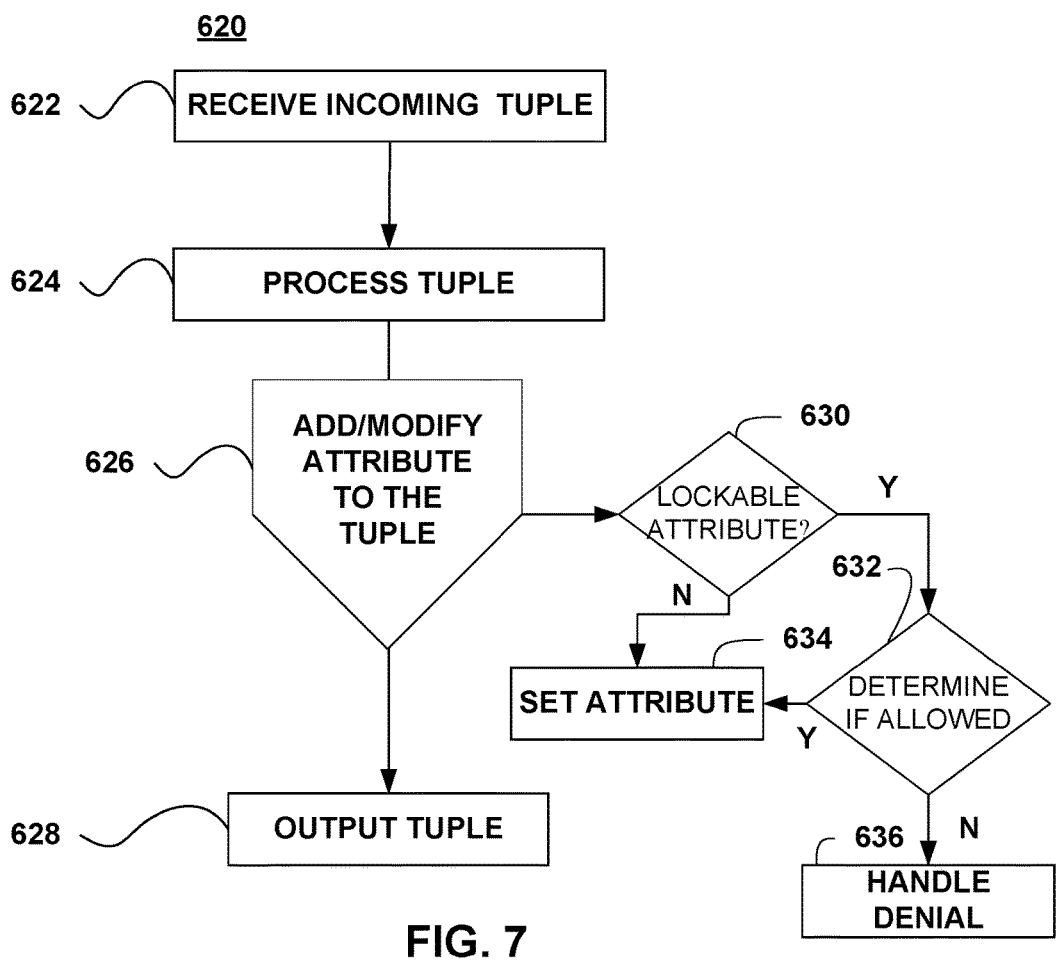
FIG. 7 illustrates an example routine for processing a tuple in a stream operator from the computing infrastructure of FIG. 1.

Now turning to FIG. 7, this figure illustrates an example generalized tuple processing routine 620, e.g., as implemented by a stream operator. A stream operator generally processes large volumes of tuples, sequencing for each tuple between the operations of receiving a tuple (block 622), processing the tuple (block 624), add/modifying one or more attributes to a tuple (block 626) and outputting the tuple (block 628). Where tuple attribute locking is supported, however, writes or other types of accesses to attributes in block 626 may additionally include a preliminary check to determine whether or not the accesses to the attributes are permitted.

In particular, as illustrated in block 630, whenever a stream operator attempts to modify or otherwise write to an attribute for a tuple, block 630 determines whether the attribute is lockable, i.e., whether the attribute is associated with a lock. If not, the attribute may be set without limitation (block 634). On the other hand, if the attribute is lockable, control passes from block 630 to block 632 to determine whether access to the attribute is allowed, i.e., whether or not the lock is set or unset. If so, control passes to block 634, and the attribute is modified. If, on the other hand, the lock is set and access is denied, control instead passes from block 632 to block 636 to handle the denial of access.

Denied access may be handled in a number of different manners in different embodiments. For example, in some embodiments, a denial of access may cause a write or modify to be ignored, and in some embodiments, denial of access may result in the generation of an exception, or may cause a stream operator to generate an error and halt execution. In the latter instance, the lock may assist in debugging an application to identify when and where undesirable attempts to modify an attribute have occurred.

Further, in some embodiments, a stream operator may wait indefinitely for an attribute to be unlocked. In some embodiments, a stream operator may wait on a different thread (e.g., a background thread), but then continue to process other tuples on a main or other thread. In some embodiments, a stream operator may wait for a predetermined maximum period of time (i.e., a time threshold), for a predetermined number of other tuples to be processed and/or wait until a pending threshold is met, e.g., until X tuples are cued up in the stream operator.

Figure 8:
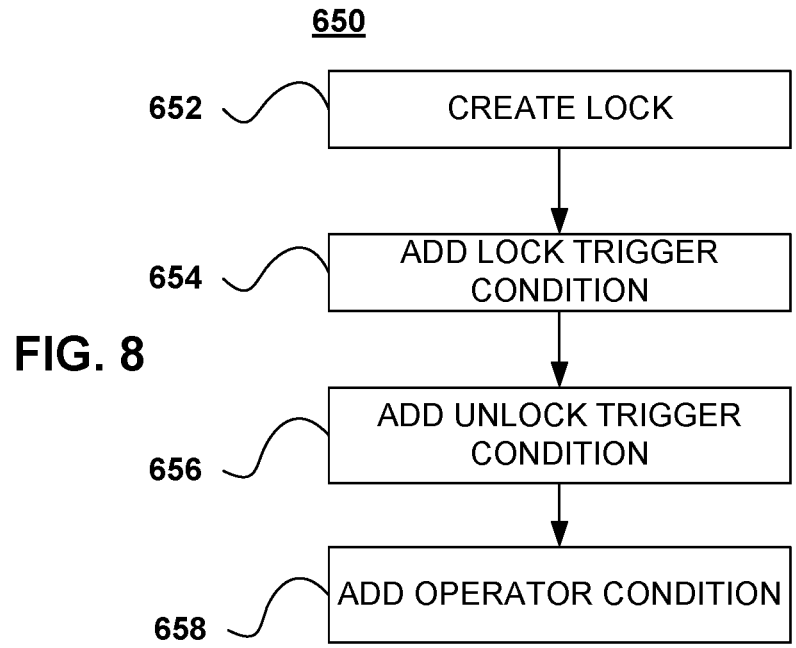
FIG. 8 illustrates an example routine for creating a lock in the computing infrastructure of FIG. 1.

Now turning to FIG. 8, locks may be created in different manners in different embodiments. For example, as illustrated by routine 650 in FIG. 8, a lock may be generated by creating the lock (block 652) and then adding zero or more of a lock condition trigger (block 654), an unlock condition trigger (block 656) and an operator condition (block 658). The creation may be initiated by a stream operator, by a stream runtime, prior to application execution, during application execution, using an API (Application Programming Interface), using a policy, and in other manners that will be appreciated by those of ordinary skill in the art having the benefit of the instant disclosure.

Figure 9:
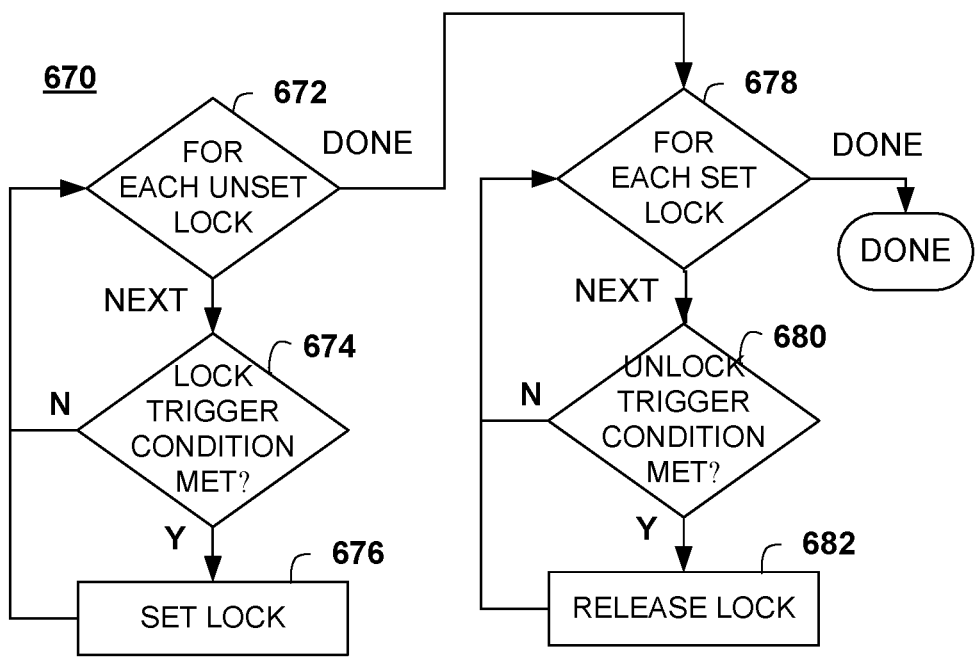
FIG. 9 illustrates an example routine for updating locks in the computing infrastructure of FIG. 1.

Control over the setting and releasing of locks may be handled on-demand in some embodiments, e.g., in response to access attempts by stream operators. In other embodiments, locks may be set and/or released separate from the stream operator accesses, such that access checks in response to access requests need only access the current lock status. FIG. 9, for example, illustrates a routine 670 capable of being performed by a stream runtime for updating the status of a plurality of locks. Block 672 for example initiates a FOR loop to process each lock that is currently identified as being unset, and for each such lock, block 674 tests the lock trigger condition for the lock, and if met, passes control to block 676 to set the lock and return to block 672 to process other unset locks. If the trigger condition is not met, block 674 bypasses block 676. Once all unset locks are processed, block 672 then passes control to block 678 to initiate a FOR loop to process each set lock. For each such lock, block 680 determines whether an unlock trigger condition is met for the lock, and if so, passes control to block 682 to release the lock and return control to block 678 to process other set locks. Otherwise, block 680 bypasses block 682. Once all locks have been processed, routine 670 is then complete.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to example embodiments, other and further embodiments of the disclosure may be devised without departing from the basic scope thereof, and the scope thereof is determined by the claims that follow.

What is claimed is:

1. A method for processing a stream of tuples in a computing system, comprising:
    receiving a stream of tuples to be processed by a plurality of processing elements operating on one or more computer processors of the computing system, each processing element having one or more stream operators;
    in a first stream operator in a first processing element, processing a first tuple received from the stream of tuples, the first tuple including a plurality of attributes, a first attribute among the plurality of attributes having a lock associated therewith, and a second attribute among the plurality of attributes being unrestricted by the lock;
    determining, for the first stream operator, a status of the lock associated with the first attribute;
    selectively inhibiting access to the first attribute by the first stream operator based upon the determined lock status; and
    continuing to permit access to the second attribute of the first tuple by the first stream operator when access is inhibited to the first attribute by the lock.

2. The method of claim 1, wherein determining the lock status is performed by a stream runtime accessible by the plurality of processing elements.

3. The method of claim 1, wherein the lock is stored as metadata passed with the first tuple, and wherein determining the status of the lock includes accessing the metadata passed with the first tuple.

4. The method of claim 3, wherein the lock is stored in a shared storage accessible to the plurality of processing elements, and wherein determining the status of the lock includes accessing the shared storage.

5. The method of claim 1, further comprising setting the lock in response to processing of the first tuple by a second stream operator that is upstream of the first stream operator, wherein determining the status of the lock includes determining that the lock is set, and wherein selectively inhibiting access to the first attribute by the first stream operator includes denying write access to the first attribute by the first stream operator.

6. The method of claim 5, wherein setting the lock is performed in response to an explicit request by the second stream operator.

7. The method of claim 1, wherein the lock includes a lock trigger condition that automatically sets the lock in response thereto to restrict access to the first attribute by one or more stream operators after the lock trigger condition has been met.

8. The method of claim 7, wherein the lock trigger condition sets the lock in response to modification by one or more stream operators, sets the lock in response to meeting a time threshold, meeting a value threshold for the first attribute, meeting a value change threshold for the first attribute, or meeting a consistency threshold for the first attribute.

9. The method of claim 1, wherein the lock includes an unlock trigger condition that automatically releases the lock in response thereto to permit access to the first attribute by one or more stream operators after the unlock trigger condition has been met.

10. The method of claim 9, wherein the unlock trigger condition is stored with metadata passed with the first tuple, the method further comprising releasing the lock after receipt by a second stream operator in response to accessing the metadata in the second stream operator.

11. The method of claim 9, further comprising releasing the lock in response to a command from a stream runtime.

12. The method of claim 11, wherein releasing the lock includes releasing the lock automatically after meeting a time threshold or a count threshold.

13. The method of claim 1, wherein the lock has an operator condition that selectively inhibits access to the first attribute by a subset of stream operators.

14. The method of claim 1, further comprising in response to denying access to the first attribute, waiting in the first stream operator for the lock to be released.

15. The method of claim 14, wherein waiting in the first stream operator for the lock to be released includes waiting in a background thread of the first stream operator and processing other tuples out of order in a main thread of the first stream operator.

16. The method of claim 14, wherein waiting in the first stream operator for the lock to be released includes waiting until a time or pending threshold is met.

17. The method of claim 1, further comprising establishing the lock using an API or a policy for a stream computing application.

18. An apparatus, comprising:
a plurality of processing elements configured to process a stream of tuples, the processing elements operating on one or more computer processors, each processing element having one or more stream operators; and
program code configured upon execution to:
receive a stream of tuples;
in a first stream operator in a first processing element, process a first tuple received from the stream of tuples, the first tuple including a plurality of attributes, a first attribute among the plurality of attributes having a lock associated therewith, and a second attribute among the plurality of attributes being unrestricted by the lock;
determine, for the first stream operator, a status of the lock associated with the first attribute;
selectively inhibit access to the first attribute by the first stream operator based upon the determined lock status; and
continue to permit access to the second attribute of the first tuple by the first stream operator when access is inhibited to the first attribute by the lock.

19. A program product for processing a stream of tuples, the program product comprising a non-transitory computer readable storage medium having program code embodied therewith, the program code comprising computer readable program code configured to:
receive a stream of tuples to be processed by a plurality of processing elements operating on one or more computer processors, each processing element having one or more stream operators;
in a first stream operator in a first processing element, process a first tuple received from the stream of tuples, the first tuple including a plurality of attributes, a first attribute among the plurality of attributes having a lock associated therewith, and a second attribute among the plurality of attributes being unrestricted by the lock;
determine, for the first stream operator, a status of the lock associated with the first attribute;
selectively inhibit access to the first attribute by the first stream operator based upon the determined lock status; and
continue to permit access to the second attribute of the first tuple by the first stream operator when access is inhibited to the first attribute by the lock.

* * * * *